Patented Nov. 10, 1942

2,301,690

UNITED STATES PATENT OFFICE 2,301,690

FLUORESCENT ARTICLE

Bennett S. Ellefson, Emporium, Pa., assignor to Sylvania Electric Products Inc., a corporation of Massachusetts No Drawing. Original application February 3, 1938, Serial No. 188,510. Divided and this application April 12, 1941, Serial No. 388,263

11 Claims. (Cl. 250—81)

This invention relates to fluorescent materials and more especially to fluorescent screens for cathode ray tubes, television tubes, oscilloscope tubes, fluoroscopes and the like.

A principal object is to provide a fluorescent material which does not lose its efficiency or change color materially because of the usual heat treatment or in connection with the exhaust schedule employed in making a tube with the material on the interior thereof, and does not lose efficiency or change color materially by reason of electron bombardment when the finished tube is in operation.

A feature of the invention relates to a fluorescent material of the zinc silicate type having a special color-control component incorporated therein.

Another feature relates to a fluorescent material of the zinc silicate type having incorporated therein a quantity of beryllium oxide in a proportion correlated to the fluorescent color desired in the finished material.

A further feature relates to a fluorescent material of the zinc silicate type having incorporated therein a special color-control component and an activator material.

Another feature relates to a selectively absorbent or fluorescent glass of the zinc-beryllium silicate type having an excess of silicate ions to enhance the selective fluorescent characteristics.

A further feature relates to a fluorescent material containing zinc, beryllium and silicate ions together with a manganese combined to form a selective absorbing and fluorescent silicate glass in which are imbedded the ortho-silicate crystals, the color of the glass being controlled mainly by the manganese. In accordance with the feature of this invention, the silicate content is more than 33.3 but less than 38 molar percent of the mixture.

A further feature relates to a "yellowish-to-orange" fluorescent material consisting of a partly absorbing and fluorescing silicate glass containing beryllium, zinc and silicate ions and manganese.

Other features and advantages not specifically enumerated, will be apparent after a consideration of the following detailed descriptions and the appended claims.

While the invention will be described as applied to the manufacture of a screen for a television tube of the cathode-ray type, it will be understood that this is done merely for explanatory purposes and not by way of limitation. The fluorescent brightness or fluorescent translation efficiency under electron bombardment, as well as the fluorescent hue of zinc-cadmium sulfides are very sensitive to variations in electron bombardment, temperature, and gaseous atmosphere such as may unavoidably be present in a high vacuum cathode-ray tube, or such as may be purposely present in so-called gas-filled cathode-ray tubes. On the contrary, zinc silicate screens are relatively insensitive to such variations. While therefore the zinc silicate type of screen is preferred because of its stability, it is very difficult to control its fluorescent color. Ordinarily a zinc silicate screen exhibits a greenish fluorescence when bombarded by high speed electrons, which while it may be unobjectionable in certain devices such as oscilloscopes, may be objectionable in such devices as television tubes. While various methods of imparting a yellowish hue to the zinc silicate screen have heretofore been suggested, they have in general required either a difficult quenching process in preparing the screen material, or they have required an extremely precise control of the surrounding atmosphere, temperature, and heat treatment duration. I have found that it is possible to produce a fluorescent screen of the zinc silicate type having a hue which may be controlled between greenish and yellowish, in a relatively simple and uniformly reproducible manner, by replacing part of the zinc oxide of the ortho-silicate with a predetermined amount of beryllium oxide, in addition to the conventional activator. The percent of beryllium oxide present will be a certain amount for the desired yellowish hue, and will be decreased in amount as the desired hue approaches the greenish. A further color control can be brought about by varying the amount of Mn (added presumably as activator) for the purpose of producing a selectively absorbing and/or fluorescent glass. Instead of relying on the Mn for the double function of activator and color control, the selective color can be achieved by using Cr, Co or V. In all cases, the visible efficiency is shifted to the longer waves with an increase of the concentration of the so-called activator substances up to about 2%.

The preferred method of preparation of the fluorescent material comprises melting together commercially pure oxides, or commercially pure materials which when appropriately heated yield such oxides. The oxides should be present in such proportions as to yield a glass which has as its primary devitrification product a crystal phase in which a portion of the zinc of the phenacite structure of willemite may have been replaced by beryllium. The resultant silicate glass containing ZnO, BeO, SiO₂ and Mn activator is subsequently devitrified to increase its fluorescent efficiency.

One preferred procedure of preparing the ortho-silicate is first to mix the raw materials in commercially pure powdered form, these raw materials including silicic acid, zinc carbonate, beryllium oxide. In order to duplicate results from time to time, the raw materials should be in a fairly standard and comparable condition in order that the same weights of raw material shall yield the same quantity of the desired elements. One characteristic of finely divided powdered matrials is their ability to absorb moisture, and the quantity of such absorbed moisture may vary from batch to batch. For this reason, it is preferred to dry all the raw materials to remove such moisture before making and weighing thereof. As typical examples of the proportions of the various materials for screens of different hues, may be mentioned the following:

|   | Molecular | Material |
|---|---|---|
|   | Percent |   |
| A | 20 | BeO |
|   | 43 | ZnO |
|   | 37 | SiO₂ |
| B | 15 | BeO |
|   | 48 | ZnO |
|   | 37 | SiO₂ |
| C | 9 | BeO |
|   | 54 | ZnO |
|   | 37 | SiO₂ |

Of the above compositions, composition "A" yields a yellowish fluorescence; composition "B" yields a greenish-yellow fluorescence; composition "C" yields a yellowish-green fluorescence. Other graduations can be produced between the yellowish and greenish hues by using molecular percents of BeO between 0 and 20 with the corresponding change in ZnO molecular percent to keep the total of these two components approximately 63 to 66 molecular percent. Preferably each of the above compositions has added to it an activator such as MnF₂, the activator being present in approximately 0.5% by weight.

The selected composition is then melted in a suitable crucible which is placed in a furnace whereby the ingredients become intimately associated, the melting preferably taking place at a temperature of between 1400 and 1500 degrees C. The melted material is then allowed to cool, resulting in a glass which has as its primary devitrification product a crystal phase in which a portion of the Zn of the phenacite structure of willemite has been replaced by Be. When the glass has sufficiently cooled it is subjected to a devitrefying process to increase the fluorescent intensity. For this purpose the glass is heated for one or two hours in a suitable crucible at a temperature of about 1000 degrees C. After devitrification and cooling, the material is ground to a powder and is ready for use as a fluorescent material. A particular advantage of the method is, that it adapts itself in a convenient way to produce a free flowing powder. This is of importance for the application of the fluorescent material to a support by the so-called air settling process. As is well known, there is a lower limit for the size of the particles of a powder, below which the particles have a tendency to stick together and form lumps. The particle size of the powder produced by the method described above can be conveniently controlled by determining experimentally the proper grinding period which furnishes the desired particle size. This is obviously much simpler than the growing of large crystals of the desired size from smaller particles. A still better uniformity of the desired particle size can be obtained, if after grinding for the most favorable period of time, a selection of the most desirable range of particle size is made by elutriation. If the intensity of the fluorescence is to be increased the above described devitrefying process may be repeated until the desired intensity is attained. When used to form a television screen it is deposited on the window portion of the television tube in any well known manner, as for example air flotation settling, liquid settling, or by being mixed with a binder which is removed by a subsequent baking operation.

While various proportions and materials have been described herein, it will be understood that various changes and modifications may be made therein without departing from the spirit and scope of the invention.

This application is a division of application Serial No. 188,510, filed February 3, 1938, issued as Patent No. 2,242,061.

What I claim is:

1. A fluorescent screen material of a devitrefied glass formed from a melted mixture of BeO, ZnO, SiO₂, wherein the BeO and ZnO constitute the greater part by molecular weight of the mixture but less than two-thirds thereof and containing an activator of the manganese type in a quantity approximately 0.5 percent by weight, whereby a selectively absorbing glass is produced.

2. A fluorescent material comprising a partly devitrefied glass containing Zn, Be and silicate ions formed from a mixture containing ZnO and BeO which together constitute the greater part thereof but less than 66.66 molar percent thereof.

3. A fluorescent material according to claim 2 in which the mixture includes an activator of the manganese type in a quantity to produce a selectively absorbing glass.

4. A fluorescent glass containing zinc, beryllium, and silicate ions and manganese, which consists of ortho-silicate crystals imbedded in a partly absorbing and fluorescing silicate glass, and in which the silicate content is more than 33.3 but less than 38 molar percent.

5. A yellowish-to-orange fluorescing glass which consists of a partly absorbing and fluorescing silicate glass and of beryllium, zinc and silicate ions, and in which the silicate content is more than 33.3 but less than 38 molar percent.

6. A fluorescent material in the form of a vitrefied melted batch of ZnO, SiO₂ and BeO, constituting a zinc silicate wherein part of the zinc ions are replaced by beryllium ions, the silica constituting from approximately 33.3 molar percent to not more than 37 molar percent, and the balance being substantially BeO and ZnO.

7. A fluorescent material according to claim 6 in which the BeO constitutes approximately 25 percent by molecular weight.

8. A selectively fluorescent silicate glass containing in crystal phase a zinc-beryllium silicate, the silicate constituting approximately 33.3 to 37 molar percent, and the balance being substantially BeO and ZnO.

9. A batch for forming a selectively absorbing fluorescent glass comprising BeO from 9 to 20 molar percent, ZnO from 54 to 43 molar percent, and SiO₂ from 33.3 to 37 molar percent.

10. A selectively absorbent glass formed from a melted mixture of BeO, ZnO and SiO$_2$, the glass having a primary divitrefication product in the form of a crystal phase in which a part of the zinc of the phenacite structure of willemite is replaced by beryllium, and in which the BeO constitutes up to 20 molar percent and the total molar percent of the ZnO and BeO is approximately 63 to not more than 66 percent.

11. A selectively absorbent glass formed from a melted mixture of BeO, ZnO and SiO$_2$, the glass having a primary devitrefication product in the form of a crystal phase in which a part of the zinc of the phenacite structure of willemite is replaced by beryllium, and in which the BeO constitutes from 9 to 20 molar percent, and the ZnO from 54 to 43 molar percent, and the SiO$_2$ approximately 37 molar percent.

BENNETT S. ELLEFSON.